(12) United States Patent
Sung et al.

(10) Patent No.: US 7,711,381 B2
(45) Date of Patent: May 4, 2010

(54) SYSTEM, METHOD, AND USER EQUIPMENT FOR MANAGING THE FLOOR FOR MULTIMEDIA COMMUNICATION SERVICE IN POC SYSTEM

(75) Inventors: Sang-Kyung Sung, Seoul (KR); Ji-Hye Lee, Seoul (KR); Sung-Jin Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 689 days.

(21) Appl. No.: 11/599,807

(22) Filed: Nov. 15, 2006

(65) Prior Publication Data

US 2007/0112914 A1  May 17, 2007

(30) Foreign Application Priority Data

| Nov. 15, 2005 | (KR) | .................. 10-2005-0109384 |
| Jan. 13, 2006 | (KR) | .................. 10-2006-0004149 |
| Aug. 22, 2006 | (KR) | .................. 10-2006-0079600 |
| Oct. 2, 2006 | (KR) | .................. 10-2006-0097399 |
| Nov. 15, 2006 | (KR) | .................. 10-2006-0112524 |

(51) Int. Cl.
*H04Q 7/20* (2006.01)

(52) U.S. Cl. .............. 455/518; 455/519; 455/517; 455/500; 455/426.1; 455/414.1; 370/310; 370/328; 370/329; 370/401; 709/202; 709/203; 709/218; 709/219

(58) Field of Classification Search ............... 455/518, 455/519, 517, 500, 422.1, 403, 412.1, 412.2, 455/426.1, 426.2, 550.1, 414.1–414.4; 370/310, 370/328, 329, 401; 709/202, 203, 218, 219, 709/228, 229

See application file for complete search history.

(56) References Cited

U.S. PATENT DOCUMENTS

| 7,283,489 | B2 * | 10/2007 | Palaez et al. ............ 370/277 |
| 2003/0008657 | A1 | 1/2003 | Rosen et al. |
| 2003/0153339 | A1 | 8/2003 | Crockett et al. |
| 2005/0124365 | A1 | 6/2005 | Balasuriya et al. |
| 2005/0273489 | A1 * | 12/2005 | Pecht et al. ............. 709/203 |
| 2007/0021133 | A1 * | 1/2007 | Coulas ................. 455/518 |
| 2009/0055473 | A1 * | 2/2009 | Synnergren ............ 709/204 |

* cited by examiner

*Primary Examiner*—Keith T Ferguson
(74) *Attorney, Agent, or Firm*—The Farrell Law Firm, LLP

(57) ABSTRACT

Disclosed is a method and a system for a Push-To-Talk (PTT) over Cellular (PoC) session open between PoC clients supporting various types of media. Although a PoC client providing an Open Mobile Alliance (OMA) PoC multimedia communication service supports a plurality of uncommon types of media, it is possible to open a session according to media types in an independent and easier manner. Also, when a new media type is supported by a new participant during a session, it is possible to add the new media type when granting the next floor. In addition, it is possible to selectively transmit media according to media types based on the PoC user's choice.

19 Claims, 7 Drawing Sheets

| | | |
|---|---|---|
| V=2 P 00001 | PT=APP=204 | length=X |
| SSRC of PoC Server performing the Controlling PoC Function | | |
| name(ASCII)=PoC2 | | |
| Accumulated Media Type | Added Media Type | NUMBER OF PARTICIPANT CAPABLE OF RECEIVING EACH MEDIA |
| PoC Address or Nick Name of PoC Client per each media in Accumulated Media Type | | |
| Stop talking timer value | Session Participant number | |

FIG.6

SYSTEM, METHOD, AND USER EQUIPMENT FOR MANAGING THE FLOOR FOR MULTIMEDIA COMMUNICATION SERVICE IN POC SYSTEM

PRIORITY

This application claims the benefit under 35 U.S.C. 119(a) of applications entitled "System, Method, And User Equipment For Managing The Floor For Multimedia Communication Service In PoC System" filed in the Korean Intellectual Property Office on Nov. 15, 2005 and assigned Ser. No. 2005-109384, Jan. 13, 2006 and assigned Ser. No. 2006-4149, Aug. 22, 2006 and assigned Ser. No. 2006-79600, Oct. 2, 2006 and assigned Ser. No. 2006-97399, and Nov. 15, 2006, and assigned Ser. No. 2006-112524 respectively, the contents of each of which are incorporated herein by reference.

BACKGROUND OF THE INVENTION

1. Field of the Invention

The present invention relates to a system, method and user equipment for managing the floor for a multimedia communication service in a Push-To-Talk (PTT) over Cellular (PoC) system, in which a PoC session is independently opened for various types of media supported by a client for selective transmission according to media types. More particularly, the present invention relates to a system, method and user equipment for managing the floor for a multimedia communication service in a PoC system, in which an independent PoC session is opened for a media type supported by a first responding client under a multimedia PoC environment, so as to allow selective media transmission according to the types of media provided by clients responding after the first responding client.

2. Description of the Related Art

Significant development of mobile communication technologies and the expansion of communication networks have led to the provision of various services and applications which use cellular phones. Also, user interests have expanded to services such as location, multimedia and Push To Talk (PTT) services, beyond the basic communication service. Particularly, the PTT service supports various supplementary functions such as instant messenger and status display, as well as group and voice communication which have been provided by an existing radio transmitter or a trunked radio system (TRS).

Standardization of a PTT over Cellular (PoC) service which employs such a PTT function in a mobile communication network is actively proceeding. One unique feature of the PoC service, which draws a distinction between the PoC service and the existing mobile communication service, is that a user can participate in a plurality of PoC sessions, thereby enabling use of a communication service while moving among the PoC sessions. A requirement that a user must be able to use communication service while moving among a plurality of PoC sessions is specified in the Open Mobile Alliance (OMA), which is a forum for specifying mobile communications services.

Meanwhile, the PoC V2.0 system supports a PoC multimedia communication service. To this end, the PoC V2.0 system defines new types of multimedia such as video, audio and text, in addition to voice.

It is also possible in the current PoC system to display a multi-stream (e.g., video or image) due to the improvement of performance of user equipments.

As a result, when the conventional PoC V1.0-based session open method and/or system is used in the PoC V2.0 system, there may be limitations in providing various multimedia services supported in the PoC V2.0, and a long time is required to open a session.

SUMMARY OF THE INVENTION

Accordingly, the present invention has been made to solve the above-mentioned problems occurring in the prior art, and an object of the present invention is to provide a system, method and user equipment for managing the floor for a multimedia communication service in a Push-To-Talk (PTT) over Cellular (PoC) system, by which it is possible to independently open a session for various types of media supported by a PoC V1.0 or PoC V2.0 client.

An object of the present invention is to enable addition of a new media type when granting the next floor when the new media type is supported by a new participant during a session.

An object of the present invention is to enable a PoC server to combine, screen and transmit multimedia streams, which have been transmitted based on the selection of PoC users, according to media types based on establishment for each multimedia session when the media types supported by clients are not common in the multimedia session.

To accomplish these objects, in accordance with the present invention, there is provided a method for floor management in a multimedia communication service by a Push-To-Talk (PTT) over Cellular (PoC) system, including transmitting a session participation request message from a session open request PoC client to a PoC server, receiving a response message by the PoC server from a session participation PoC client in response to the session participation request message, storing the response message including media type information of the session participation PoC client in a temporary session media type storage unit, and receiving, by the session open request PoC client, information about the session participation PoC client which is included in the response message.

In accordance with the present invention, there is provided a Push-To-Talk (PTT) over Cellular (PoC) system for providing a multimedia communication service and managing a floor for the service, including a session open request PoC client for transmitting a session participation request message, a PoC server for receiving the session participation request message from the PoC client and transmitting a response message in response to the session participation request message, and a temporary session media type storage unit for storing the response message including media type information. Herein, the media type information can be indicated in an SIP 200 OK message and an SIP session participation request message, or by adding a new row for media type information to a Real-time Transport Control Protocol RTCP message format.

In accordance with the present invention, there is provided a user equipment for providing a multimedia communication service and managing a floor for the service in a Push-To-Talk (PTT) over Cellular (PoC) system, wherein the user equipment manages the floor of the service by transmitting a session participation request message for managing the floor for the service and receiving a response message thereto.

BRIEF DESCRIPTION OF THE DRAWINGS

The above and other objects, features and advantages of the present invention will be more apparent from the following detailed description taken in conjunction with the accompanying drawings, in which:

FIG. 6 is a view illustrating the format of an RTCP message for granting the floor after session opening according to the present invention.

DETAILED DESCRIPTION OF THE PREFERRED EMBODIMENT

Hereinafter, the present invention will be described in detail with reference to the accompanying drawings. Descriptions of well-known functions and constructions are omitted for the sake of clarity and conciseness.

The following description will be given with respect to the case in which the present invention is applied to a PoC system, which provides a PTT service using a cellular mobile communication network from among PTT systems.

Generally, a PoC system uses a session initiation protocol (SIP) and an SIP extension protocol in order to transfer session participation information of a group communication, and uses an XML configuration access protocol (XCAP) in order to acquire group information. The following embodiment of the present invention may be implemented with the above-mentioned protocols, and the construction of the present invention can be based on the PoC Rel. 1 system. First, the following description will be given with respect to a general PoC system, to which the present invention is applied.

Figure 1:
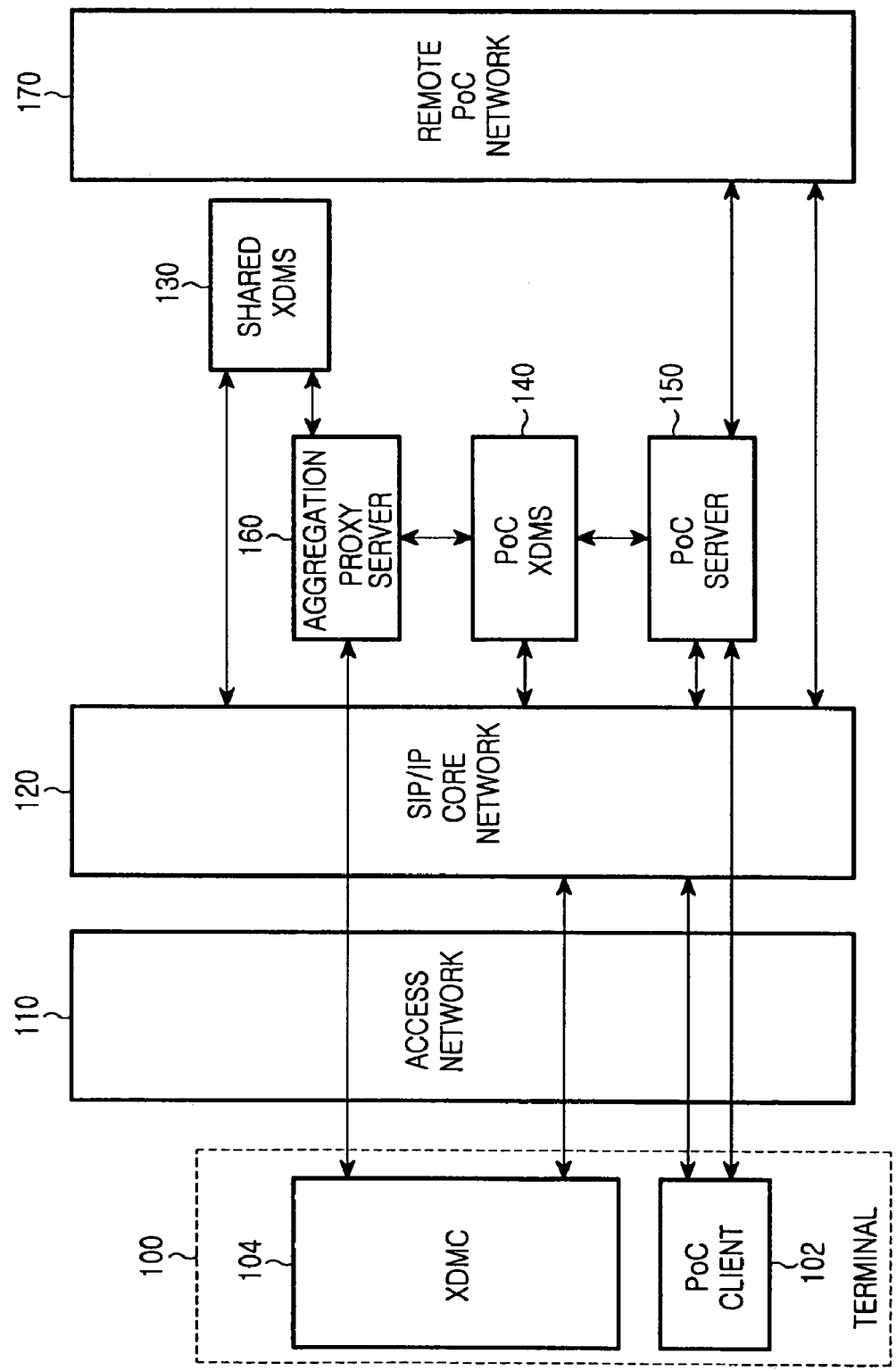
FIG. 1 is a view illustrating the construction of a conventional PoC service system.

FIG. 1 is a conceptual view illustrating the construction of a general PoC service system and a network relative to the system.

The general PoC system may include a PoC user equipment (UE) 100, Extensible Markup Language (XML) Document Management Servers (XDMSs) 130 and 140, and a PoC server 150. In addition, the PoC system may further include an aggregation proxy server 160. The aforementioned components may be connected to each other through an access network 110, an SIP/IP core network 120 and a remote PoC network 170.

The PoC UE 100 may include a PoC client 102 and an XML Document Management (XDM) client 104.

The PoC client 102, which represents a service requester contained in the PoC UE 100, resides in the PoC UE 100 and performs a network access so as to provide a PoC service subscriber with PoC service. The PoC service subscriber may be provided with a PoC service through the PoC UE containing the PoC client. In the following description, the "PoC client" will be used as the general term for a PoC service subscriber and the UE including a PoC client. Also, the reference numeral of the PoC client will be omitted unless a specific distinction is required.

The main functions of the PoC client are to establish, participate in and terminate a PoC session, in view of a PoC service subscriber (i.e., a PoC user). In addition, the PoC client creates and transfers a talk burst, supports an instant personal alert and performs authentication when accessing a PoC service. The PoC client may be connected to the SIP/IP core network 120, which supports SIP/IP multimedia, through the access network 110.

The SIP/IP core network 120 is connected to the PoC server 150 and the XDMSs 130 and 140 in order to support the PoC service. In this case, the PoC server 150 performs a controlling PoC function for maintaining a PoC session, or performs a participating PoC function for participating in a PoC session for a point-to-point communication or a multipoint communication.

Meanwhile, a PoC service may be accompanied with a service which creates a group session such as a conference communication. To this end, the OMA standard defines the XDMSs 130 and 140 and the XDM client 104 for a group list service. The construction shown in FIG. 1 includes a PoC XDMS 140 used for a PoC service and a shared XDMS 130 which can be commonly used even in other service enablers. Information about a group and a group member may be input into the XDMSs 130 and 140 through the PoC client. The PoC client can understand information about other PoC clients, which the PoC client itself can call, through an individual or a group list received from the XDMSs 130 and 140. Meanwhile, the generation, correction and management of the group and group members in the XDMSs 130 and 140 may be performed through a reliable communication network by the PoC service provider, such as the Internet or an Intranet. Detailed description of protocol and concrete contents for an XML text management such as creation, correction and deletion of a group list will be omitted.

For a group service, upon receiving a group list-related request from the XDM client 104, the aggregation proxy server 160 routes the request to the XDMSs 130 and 140 according to rules.

Figure 2A:
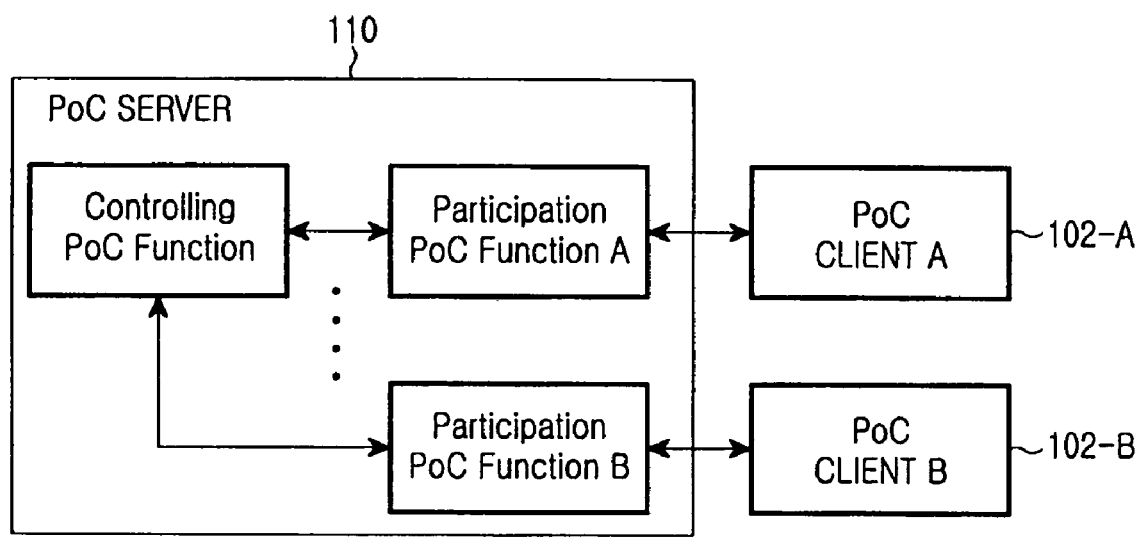
FIG. 2A is a block diagram illustrating the construction of a conventional PoC server.

FIG. 2A is a block diagram illustrating the construction of a conventional PoC server.

The functions of the PoC server may be classified into a controlling PoC function (CF) for generally maintaining a PoC session and a participating PoC function (PF) for handling maintenance for each PoC session. The characteristics according to each function of the PoC server will be described with reference to Tables 1 and 2.

TABLE 1

| Controlling PoC Function (CF) |
| --- |
| Provides centralized PoC session handling |
| Provides the centralized Media distribution |
| Provides the centralized Talk Burst Arbitration functionality including talker identification |
| Provides SIP session handling, such as SIP session origination and termination |
| Provides policy enforcement for participation in group sessions |
| Provides the participants' information |
| Collects and provides centralized media quality information |
| Provides centralized charging reports |
| May provide transcoding between different codecs |
| Support Talk Burst Control Protocol Negotiation |

As shown in Table 1, the CF maintains a PoC session. Particularly, the PoC server receives requests for the floor from PoC clients, arranges an order in which to give the clients the floor, and gives the clients the floor in that order. The PoC server also distributes a talk burst from a specific PoC client to all PoC clients participating in a group PoC call, and provides information about the PoC clients participating in the group PoC call.

As shown in Table 2 below, the PF manages sessions connected between a CF and each PoC client during a PoC session. Particularly, the PF relays a request for the floor transmitted from a PoC client and the floor given to the PoC client. Also, the PF performs a media relay function between the CF and the PoC client, in such a manner that the PF provides a transcoding function when the CF and the PoC client use different codecs, and the PF provides a filtering function for filtering one voice according to the choice of the user when voice communication is performed in a session while voice communication is being performed in another session during multiple simultaneous PoC sessions.

TABLE 2

Participating PoC Function (PF)

Figure 3:
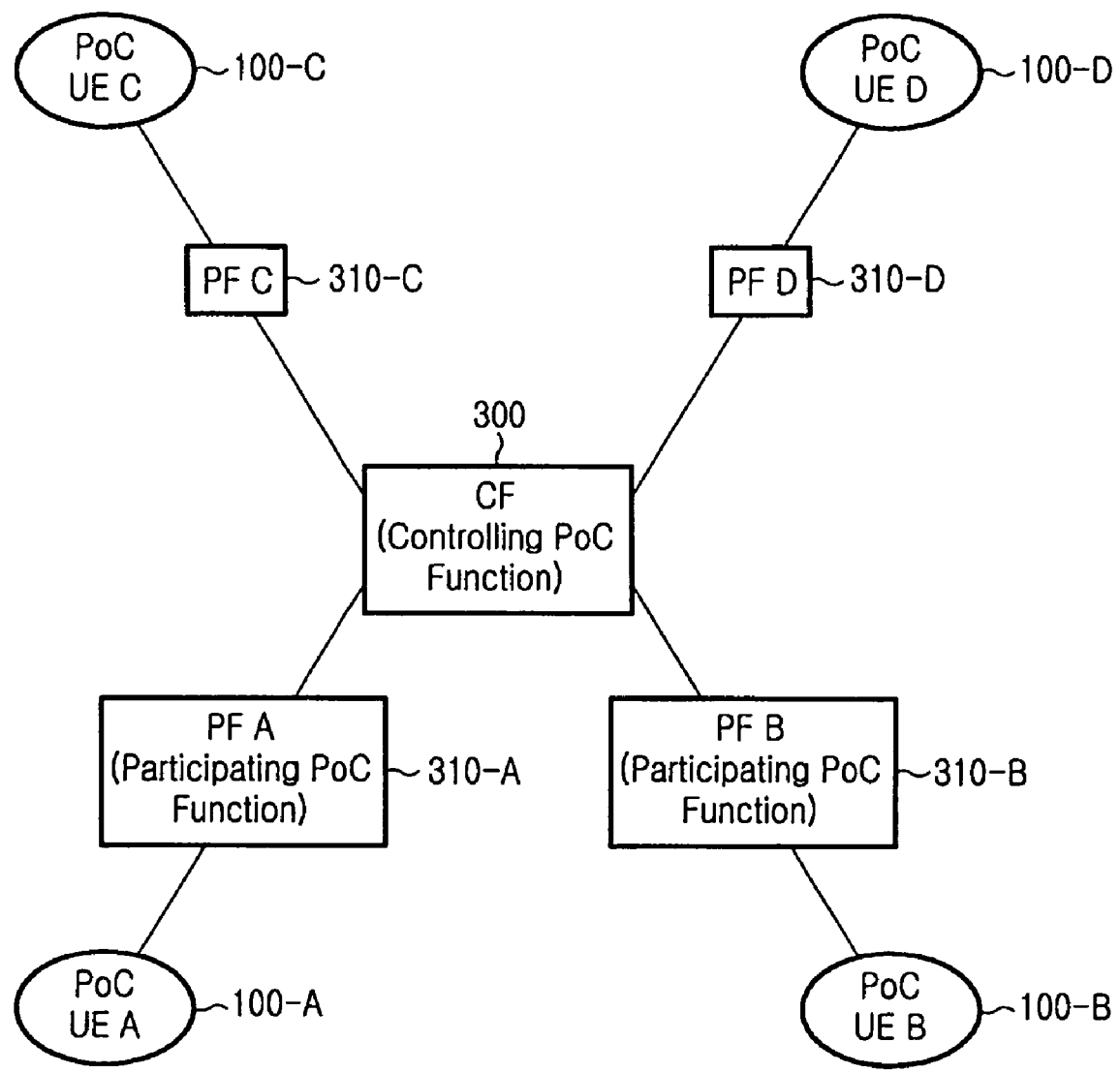
FIG. 3 is a block diagram illustrating a controlling PoC function unit and a participating PoC function unit in a PoC server.

Provides PoC session handling
May provide the Media relay function between PoC Client and Controlling PoC server
May provide user media adaptation procedures
May provide the Talk Burst control message relay function PoC Client and Controlling PoC server
Provides SIP session handling, such as SIP session origination and termination, on behalf of the represented PoC Client
Provides policy enforcement for incoming PoC session (e.g. access control, incoming PoC session barring and availability status)
May collect and provide media quality information
Provides the participant charging reports
May provide filtering of the media streams in the case of simultaneous sessions
May provide transcoding between different codecs
May support Talk Burst Control Protocol Negotiation
Stores the current Answer Mode and Incoming PoC Session Barring preferences of the PoC Client FIG. 3 is a block diagram illustrating the CF unit and PF unit of a PoC server.

PoC clients 100-A to 100-D are connected to a CF 300 through PFs 310-A to 310-D and establish PoC sessions. Thereafter, media for a corresponding talk burst of a PoC client that has been granted the floor from the CF 300, are sent to each of other PoC clients. In this case, the PoC client that has the floor can talk only after having checked information of PoC clients participating in the group session.

Meanwhile, in the call processing technology for communication setup in a PoC system, various procedures can be performed according to request and situation of a sender and a receiver. Characteristics of the PoC system requested according to the setup of the sender and receiver in the OMA are as follows.

First, the receiver can set up its own response mode according to the request of the PoC client, and the response mode can be classified into an auto-answer mode and a manual response mode. In the auto-answer mode, when the receiver has been included in a PoC client list assigned by the receiver, a corresponding network immediately sends a response to the sender, instead of a manual response of the receiver. This is done since the PoC server has a function to store the response mode and the corresponding user list according to the response mode setup request of the UE. Meanwhile, the manual response mode corresponds to when the receiver is not included in the auto-answer user list, it is unclear that the receiver is included in the auto-answer user list, or the receiver is set up to manually respond to all users. In the manual response mode, a PoC communication request is transmitted to the UE through a reception network, and the PoC communication is connected by permission of the corresponding PoC client.

Second, the PoC system may have an on-demand session mode and a pre-established session mode according to whether the PoC client is connected with a PoC server within the home network of the PoC user. In the pre-established session mode, the PoC client establishes a specific session in advance between the PoC client and the PoC server belonging to the user's home network according to the request of the PoC client. Such a pre-established session is a function where the PoC client negotiates media parameters with the PoC server in advance so that session establishment can be rapidly progressed without renegotiation of the media parameters to be used between the server and the client in the future.

In order to open the pre-established session, the PoC client provides media parameters supported by the PoC client, media parameters provided by the server, and a response to the media parameters provided by the server to a Session Description Protocol Multipurpose Internet Mail Extensions (SDP MIME) body by using an SIP INVITE method. Then, the PoC client adds a conference URI (Uniform Resource Identifier) containing identification information of the newly open pre-established session to the response message received from the server and sends the URI-added response message to other PoC clients.

When using such a pre-established session, it is possible to preliminarily negotiate an IP address, a port number, a codec to be used and a talk burst control protocol. In the on-demand session mode, the PoC client has not made a pre-established session or another PoC client has not made a pre-established session. Thus, the PoC client performs a PoC call connection procedure after receiving an invitation message of another PoC client.

A setup of a response mode for the communication request in the PoC system can be stored in both the PoC server, which is an element on the network, and the PoC client, which is a UE.

When a response mode is established in the home network managing the PoC client, the response mode is embodied in the PoC server, which performs a session PF within the home network including the PoC client.

When the response mode has been established in the network, upon PoC communication being requested from another PoC server, the PF immediately and automatically transfers a session progress message to the communication request network in response to the request. Therefore, when the auto-answer mode has been established, the call request procedure is simplified as compared to when a response is transmitted after the session setup message is transferred to the PoC client, thereby reducing the initial time period required for granting the floor.

However, when the response is automatically performed in the network, since a result other than a user's response can occur, a response mode can be set up even in the PoC client. In this case, the response mode of the PoC client has a higher priority than the response mode set up on the network. The PoC client changes its own response mode and requires the PoC server to update the response mode to solve privacy problems occurring when a response mode is not reflected in real time due to a signal delay or error in the network.

In summary, while the user's response mode for the PoC service can be set up in both the PoC server and PoC client, a response mode is determined by the PoC client in which the latest user's will has been reflected, and a media (e.g., actual user's voice, image) stream is transferred based on the determination.

Hereinafter, a conventional PoC multimedia session open procedure in the aforementioned PoC system will be described.

A sending-side PoC client requests a call processing by transmitting a request message for participating in a multimedia (e.g., audio, video, and various texts) session by means of an SIP protocol. In response to such a call processing request, a receiving-side client performs various response procedures depending on a response mode set up in the corresponding PoC server and on whether a pre-established session exists therein. The call processing procedure for PoC communication will be described by using a single network for both the sending side and the receiving side.

A sending-side PoC client sends a SIP INVITE request including SIP address information of a receiving-side PoC client, with whom the sending-side PoC client desires to communicate, to a corresponding SIP/IP core network. In this case, a SIP session participating request message may further include elements such as PoC address information of the sending-side PoC client, a required media parameter, and characteristic value information identifying a PoC service. Herein, the required media parameter may include a plurality of characteristic values such as rate, payload type, and an encoding method for audio and video, when the required session is related to multimedia.

The SIP session participating request message is transferred to a participating PoC server via corresponding IMS servers (i.e., a proxy-call server control function (P-CSCF) and a serving-call server control function (S-CSCF)) in the IMS network, through a path query in a dynamic host configuration protocol (DHCP) server or a domain name server (DNS). When a general communication is requested, the participating PoC server connected to the PoC client can be constructed separately from the controlling PoC server managing a talk burst of the opened session, so that the SIP INVITE request sent by the PF is transferred to the CF via the SIP/IP core network of a corresponding network.

Meanwhile, a PoC session controlling network including a CF transfers an SIP session participating request message to the receiving-side network, and then receives a response message from the receiving-side network. The SIP message responding from the receiving-side network may be a 1xx provisional response message, a 2xx successful response message, or one of 4XX to 6XX error response messages, according to setup of the PF and the receiving-side PoC client. In the auto-answer mode, an SIP 183 Session Progress signal may be received as a response message, through which a connection between the PoC server and the client can take place in an IMS network of a communication requester. A communication permission signal of the receiving-side PoC client is sent as an SIP 183 Session Progress or an SIP 200 OK response, and transmitted to the PoC client via the PoC server of the CF and PF. When the 200 OK response or 183 Session Progress signal has been received from the receiving-side PoC server, the CF determines that a PoC call has been connected, and sends the sending-side PoC client a Floor Granted signal to grant the floor for a talk burst. Granting the floor for a talk burst according to the response, that is, according to the SIP 200 OK or 183 Session Progress signal, may be identified by using "confirmed" or "unconfirmed". The CF needs a buffering function when receiving a response of "unconfirmed".

Meanwhile, after having received a response signal to the SIP INVITE request signal, the sending-side PoC client receives a Floor Granted signal to transfer a talk burst transmission permission signal (e.g., call connection sound) through a real time control protocol (RTCP). The Floor Granted signal is created by the CF having a talk burst negotiation right, and transferred to the PoC client through the PF managing the corresponding PoC client. Since the Floor Granted signal does not use the SIP protocol but uses a path of a bearer, the Floor Granted signal can be transmitted without passing through an SIP/IP core network such as the IMS. The PoC client who confirmed the call connection sound transfers a media (e.g., voice) stream using a real-time transport protocol (RTP).

Figure 2B:
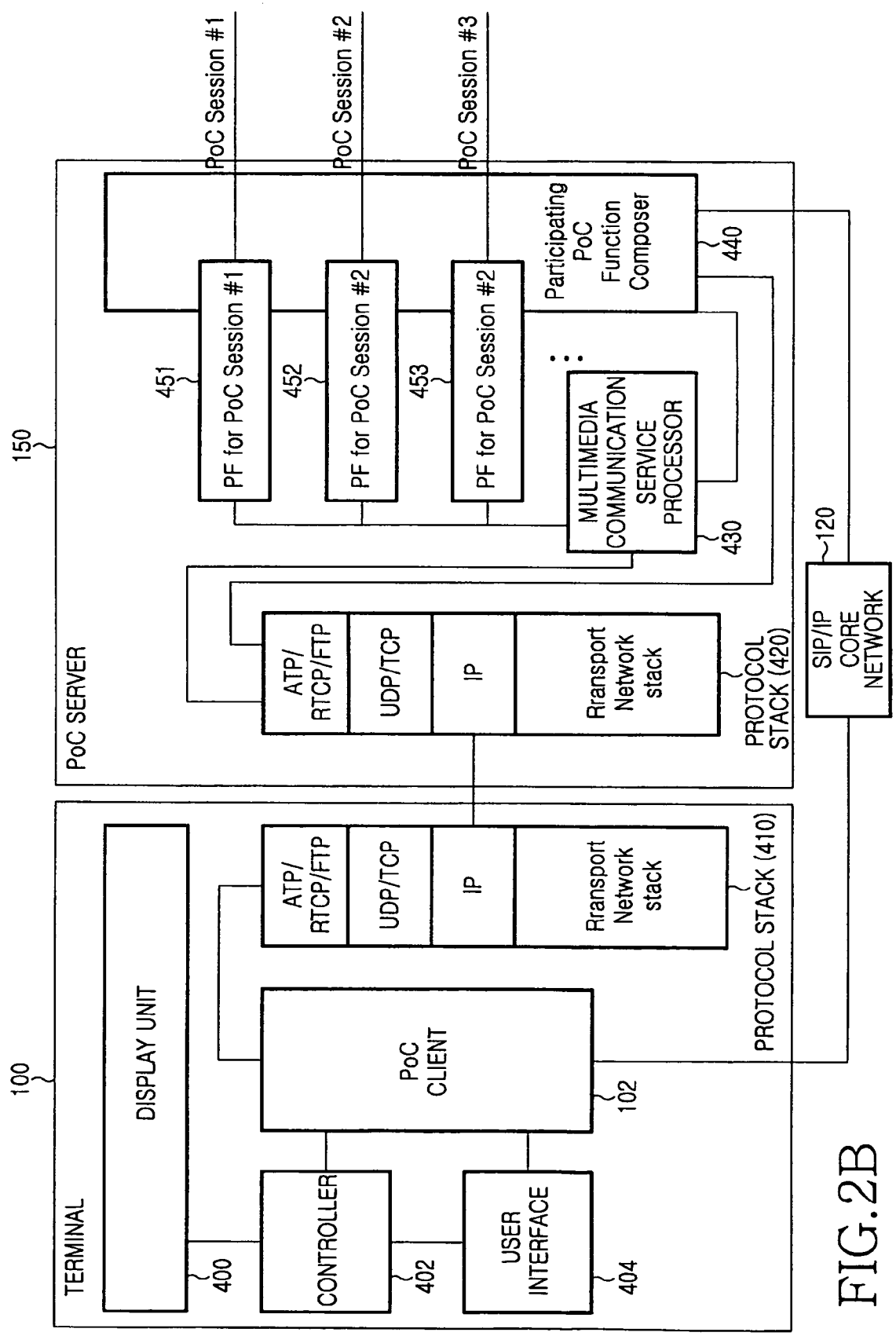
FIG. 2B is a block diagram illustrating the conventional connection between a PoC UE including a PoC client and a PoC server.

FIG. 2B is a block diagram illustrating the conventional connection between a PoC UE including a PoC client and a PoC server.

The PoC client 102 is a device for interface with the user, and includes a key input unit which outputs specific key input data according to input of each key contained therein. In addition, the PoC client includes a data transmission unit, which performs transmission/reception of packet data to/from the PoC server. Also, the PoC client includes a display unit 400, which displays media data received through the data transmission unit, and displays data output through the key input unit. In addition, the PoC client includes a controller 402. The controller controls data transmission/reception of the PoC client, controls display, and controls creation and transmission/reception of an INVITE reservation message for participating in a chat PoC group. The PoC client includes a storage unit, which stores information relating to the entire functions of the UE, data relating to provision of a PoC service, a user account for identifying the UE, and information set by the user or provided from the server Hereinafter, the present invention will be described in detail with reference to the accompanying drawings so that those skilled in the art can easily carry out the present invention.

Figure 4:
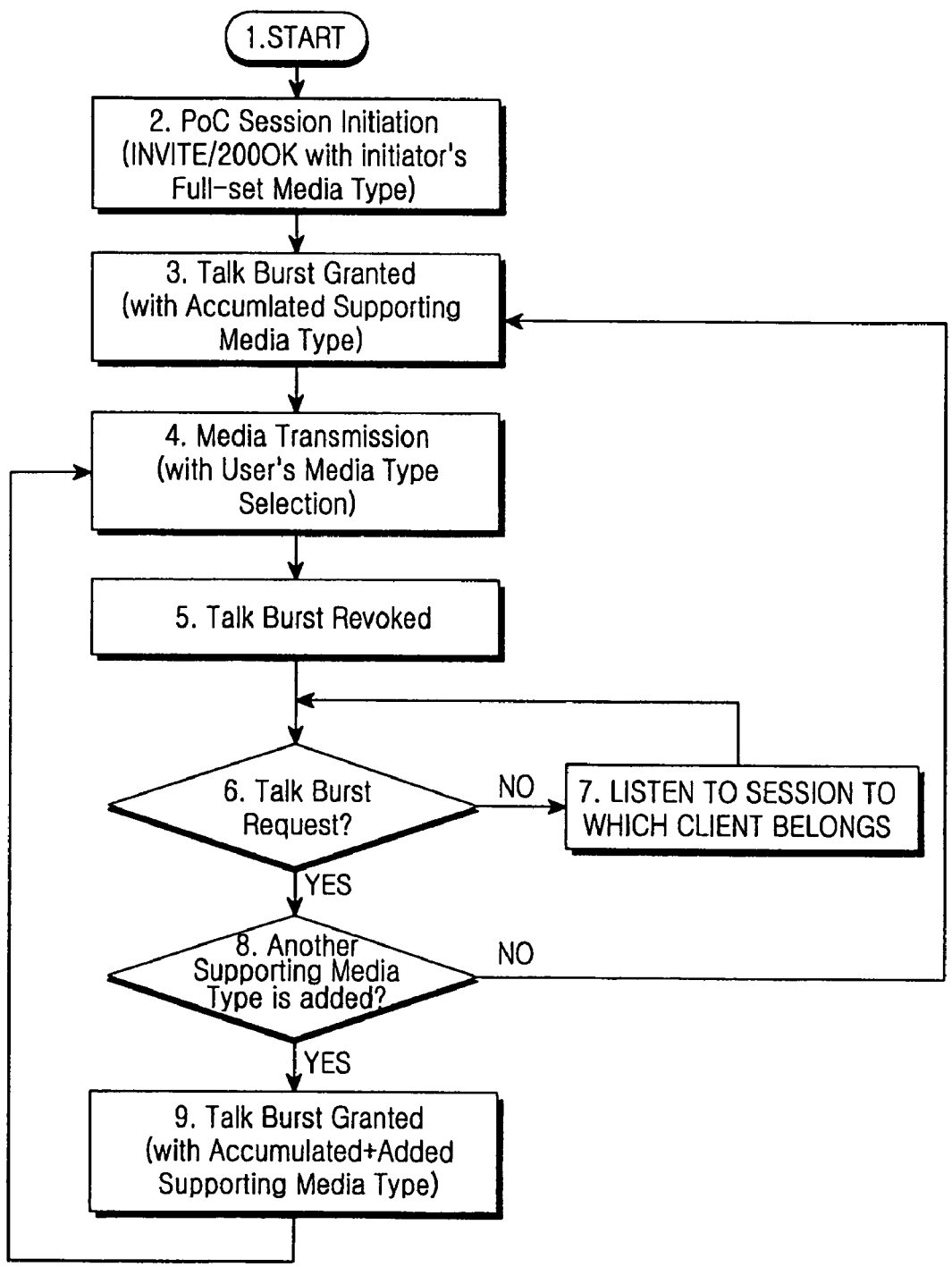
FIG. 4 is a flowchart illustrating the procedure for providing a complete PoC multimedia service according to the present invention.

FIG. 4 is a flowchart illustrating the procedure for updating talk burst data according to media types by a PoC client according to the present invention.

The procedure of the flowchart shown in FIG. 4 is as follows.

1. Session open starts.
2. A session supporting a full set of media types required by a PoC client (i.e., session initiator), who wants the session open, is opened.
3. A PoC server receives a response of a participating PoC client (i.e., session participant) invited to the session by using a session participating request message received from a session open PoC client (i.e., session initiator), stores media type information of the invited PoC client (i.e., session participant) in a temporary storage unit, and inserts the information into a Floor Granted message (e.g., Talk Burst Granted message).
4. The PoC client who has obtained the floor selectively transmits a message according to media types with reference to the Floor Granted message.
5. Floor Revoke: time-out based on the policy (e.g., time-out by termination of the floor or by a floor request of a different PoC client having a higher priority) which is stipulated by the PoC server.
6. The PoC client determines whether to again request the floor. When it is determined that the PoC client will not again request the floor, the PoC client listens to a session, to which the PoC client belongs (step 7). In contrast, when it is determined that the PoC client will again request the floor, the PoC client proceeds to step 8.
7. The PoC server determines whether a new media type is supported in a session due to session participation of a new PoC client during progression of the previous floor. When it is determined that a new media type is not supported in the session, the PoC server supports the same media type as that supported in the previous session, and grants the floor based on the support (step 3). In contrast, when it is determined that a new media type is supported, the PoC server proceeds to step 9.

9. The PoC server updates information about a newly supported media type, and grants the floor with media type information of PoC clients participating in the current session.

Thereafter, each PoC client newly-participating in the session also performs the procedure from step 1 of FIG. 4.

Figure 5:
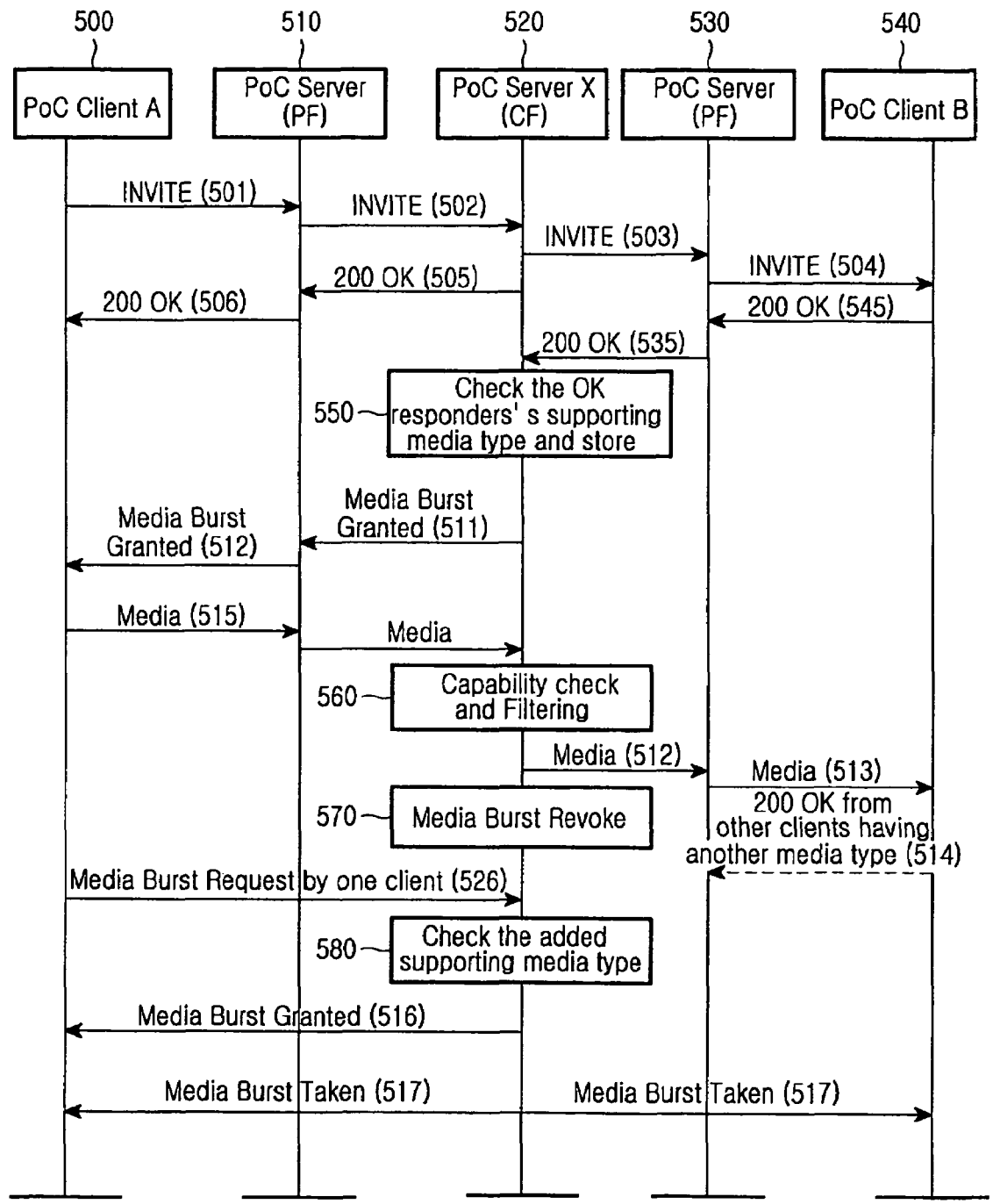
FIG. 5 is a flow diagram illustrating a signal flow between PoC clients and PoC servers in order to perform an efficient session connection between PoC clients supporting various media types according to the present invention.

FIG. 5 is a flow diagram illustrating a signal flow between PoC clients and PoC servers in order to perform an efficient session connection between PoC clients supporting various media types according to the present invention.

When a session participation request message of PoC client A 500, who wants to open a PoC session, arrives at a PoC server X (CF) 520 through a participating PoC server (PF) 510, the CF forwards the session participation request message to invited PoC clients (steps 501 to 504). The session participation request message may include a media type requested by the PoC client A 500 in the body of the message. Independently of the forwarding of the session participation request message, when the PoC client A 500 having requested opening of the PoC session satisfies a session open condition based on a policy stipulated by the PoC server, the CF 520 immediately sends a 200 OK response message, which is an SIP message, to the PoC client A 500 (steps 505, 506). As a result, a PoC session is established between the PoC client A 500 and the CF 520. When a first SIP 200 OK message in response to the session participation request message forwarded by the CF 520 is received from PoC client B 540, a separate PoC session is established between the PoC client B 540 and the CF 520. The SIP 200 OK response message of step 535 may include a media type supported by the PoC client B 540 in the body of the message. The first SIP 200 OK response message of step 535 may be sent by a client, who has been invited by the PoC client A 500, other than the PoC client B 540.

According to the present invention, the CF 520 determines the media type supported by the PoC client B 540, who has sent the SIP 200 OK response message of step 535, through the response message, and stores the media type information in a temporary session media type storage unit (not shown). The temporary session media type storage unit functions to receive a session participation request and a first response of a receiving-side PoC client, and to determine and store information of the media type supported by a corresponding PoC client (step 550). The temporary session media type storage unit may be either included in the PoC server (i.e., the CF 520) or separately constructed.

In addition, each media type may be bound with a media-floor control entity. Herein, the term "media-floor control entity" represents a resource for performing the floor management to enable the transmission of a bound media type. The floor management is performed by a state machine which allows access to only one user at a time with respect to one medium.

The media-floor control entity can process one or more media types or media streams based on a definition by the PoC user or through negotiation. Therefore, one or more media types may be bound with one media-floor control entity. Meanwhile, in the case of a discrete media type or the like, there can not be a bound media-floor control entity. Such a media type, which is not bound with a media-floor control entity, may be not influenced by the floor management in a corresponding session.

Therefore, the method for acceptance or rejection based on each media type by a receiving-side client according to the present invention may imply that the first SDP proposal accepts or rejects both a corresponding media type and a media-floor control entity bound therewith together.

According to the present invention, the CF 520 stores information of the media type supported by the PoC client B 540, who has sent the first SIP 200 OK response message, in the temporary storage unit (step 550), and sends a Floor Granted message (e.g., Talk Burst Granted message) including the information of the media type supported by the PoC client B 540 to the PoC client A 500 (steps 511, 512). The Floor Granted message of step 511 has the format of an RTCP shown in FIG. 6. The PoC client A 500, who has obtained the floor, can completely or selectively transmit a multimedia steam of media types supported by the PoC client A 500 according to the user's choice of the PoC client A 500. That is, a message corresponding to a media type supported by the PoC client B 540, which is included in the Floor Granted message, may be sent in steps 511 and 512. Although the PoC client A 500 ignores media type information of the PoC client B 540, which is included in the Floor Granted message of step 511, and sends all types of media (i.e., super-set or full-set media) supported by the PoC client A 500, the CF 520 screens and transmits only a media stream corresponding to a specific media type, which can actually be received by the PoC client B 540, to the PoC client B 540 (step 560). When there are other PoC clients having established a session with the CF 520 while a process for granting the floor is progressing, the CF 520 transmits each media stream obtained by screening each media type supported by each of said other PoC clients, to each corresponding PoC client. Also, when the CF 520 has received an SIP 200 OK response message from a different PoC client, who supports a new media type other than the media type supported by the PoC client B 540, in response to the session participation request message while media is being transmitted or a session is progressing, the CF 520 stores the new media type supported in the corresponding session in the temporary storage unit according to each session (step 580). The storage method of step 580 is same as that of step 550, in which the CF 520 checks and stores information, which is included in the SIP 200 OK response message transmitted in step 535, in the temporary storage unit. After the SIP 200 OK response message of a first respondent is received by the CF 520, the SIP 200 OK response message of a different PoC client can arrive at the CF 520 at any time.

When the floor of the PoC client A 500 transmitting a multimedia stream ends, the CF 520 can receive a floor request from any one PoC client currently participating in the corresponding session (step 526). The CF 520 sends a Floor Granted message, which includes information about accumulated media types used in the corresponding session and information about all added media types therein, to the PoC client requesting the floor with reference to information stored in the temporary storage unit (step 516). The CF 520 transmits the Floor Granted message to the corresponding PoC client, and transmits a Floor Taken message (e.g., Media Burst Taken message) to the other PoC clients participating in the session (step 517). The Floor Taken message may include information about a media type included in the Floor Granted message so as to inform the type of media to be transmitted by the PoC client having obtained the floor.

In addition, the Floor Taken message may include information about the number of session participants, the number of supporting clients for each media, and addresses of session participants according to media.

Meanwhile, in FIG. 5, step 505 of transmitting the 200 OK message to the PoC client having requested a session may be performed after the CF 520 has received a 200 OK message from the receiving-side PoC client B 540. Similar to the other procedures, a session between the client and the server can be opened, in such a manner that a session description protocol (SDP) value included in the 200 OK message transmitted in step 505 to the PoC client having requested a session can support a full set of media requested by the PoC client A 500 upon the session open.

Meanwhile, a Floor Granted message sent from the CF 520 to the PoC client A 500 may include either the information of the media type supported by the PoC client B 540, as described in steps 511 and 512, or an active/inactive state of the media type supported by the PoC client B 540, instead of the information of the media type supported thereby.

The case in which the CF 520 sends a Floor Granted message including an active/inactive state of a media type will now be described.

In step 505, the CF 520 sends a 200 OK response message granting a full set of media types included in a session participation request message, which has been transmitted from the PoC client A 500 in step 501, thereby opening a session to accept the full set of media types. However, although a session to accept the full set of media types requested by the PoC client A 500 has been opened as described above, a media type included in a 200 OK response message sent from the receiving-side PoC client B 540 in step 545 is set to an active state in step 550, and a media type not included in the 200 OK response message sent from the receiving-side PoC client B 540 is set to an inactive state. Thereafter, in step 511, a Floor Granted message (e.g., Media Burst Granted message) may be sent with respect to only an active state media type.

Therefore, a PoC session between the PoC client A 500 and the CF 520 is opened to accept the full set of media types requested by the PoC client A 500, through step 506. However, since the PoC client A 500 receives a Floor Granted message in step 512 with respect to only an active state media type, the PoC client A 500 may transmit only the active state media type in step 515.

Thereafter, when a 200 OK response message received from still another session participation PoC client in step 514 includes an inactive state media type in a session being currently progressed, the CF 520 activates the corresponding media type so as to set the corresponding media type to an active state. Then, it is possible, through an SIP UPDATE message or re-INVITE message in a PoC session between the sending-side PoC client and the PoC server X, to refresh the corresponding session so as to accept transmission of the media type.

Thereafter, when the CF 520 receives a Floor request message from the PoC client A or another PoC client participating in the corresponding PoC session in step 526, the CF 520 checks an additionally activated media type in step 580. Then, the CF 520 may selectively send a Floor Granted message with respect to only active state media types in step 516, while sending a Floor Reject message (e.g., Media Burst Reject message) with respect to inactive state media types.

FIG. 6 is a view illustrating the format of an RTCP message for granting the floor by the CF to a PoC client after session open according to the present invention.

The format of a media burst control protocol (MBCP) message using the existing RTCP includes media type information. Herein, the MBCP may include field values that represent the value of a Stop Talking timer and the number of participants so as to be compatible with a PoC 1.0 system. In the MBCP message, an Accumulated Media Type field includes all media types supported by PoC clients, who have participated in a corresponding session under the previous floor. For example, when the first floor is granted, the value of the Accumulated Media Type field corresponds to the value of the media type supported by a first response client. An Added Media Type field of the second column includes the value of a new media type when a PoC client newly-connected to the CF in a current session supports the new media type, other than those which are included in the Accumulated Media Type field and supported by the CF in the current session. When a new media type other than media types used in the previous floor is not supported, the value of the Added Media Type field has "0" of "Null". The lengths of the two fields are variable depending on determination of the CF.

Also, the Floor Granted message, which is to be transmitted to a PoC client who has received the floor, may selectively include the nickname and address information of PoC clients participating in a corresponding session, and information about the number of session participants capable of receiving each media, which are classified according to media.

Meanwhile, the aforementioned function may be performed with only the value of the Accumulated Media Type field, without the Added Media Type.

According to another embodiment of the present invention, MBCP messages defined independently according to media types may be transmitted in order to provide a PoC client with information of media types supported in the session. When MBCP messages independent from each other according to media types are used as described above, media types supported in a session are identified based on whether or not the respective MBCP messages according to media types are transmitted/received, so that the Added Media Type and Accumulated Media Type field may be not used.

The aforementioned method, which allows a client who has been granted the floor to obtain information of media types supported in a corresponding session based on determination whether an MBCP message according to each media type is received, does not depart from the basic principle of the present invention according to which information of media supported by a session is transferred through transmission of an MBCP message.

According to the present invention, the format of an RTCP message (i.e., MBCP Taken message) for notifying PoC clients about the taken floor is also constructed in a method similar to that as described above, so that the MBCP Taken message includes a value of a field for identifying a media type included in a Floor Granted message, in addition to the basic format of the PoC 1.0. Similar to the Floor Granted message, the Floor Taken message transmitted to PoC clients who do not have the floor while participating in a session, may include the nickname and address information of PoC clients participating in the corresponding session, and may include information about the number of session participants capable of receiving each media. Also, the Floor Taken message may additionally include information about a media type supported by the PoC client who currently has the floor.

As used herein, the term "media type" is used as information for distinguishing the respective media properties among a voice, a video, an image, a text, etc. Also, for an extended technology of the present invention, the term "media type" may be regarded as a minimum basic unit for distinguishing media of the same type from each other. For example, when there are two different videos, that is, when there are video 1 and video 2 which are media of the same type, the video 1 and video 2 may be regarded as media types different from each other depending on the characteristics of media parameters associated therewith. Therefore, the meaning of the aforementioned term "media type" may used in order to either indicate the same type of media or be enlarged to a minimum basic unit for distinguishing streams according to media.

Therefore, according to an example of an enlarged technology, when a sending-side PoC client requests opening of a session including media types of audio 1, audio 2, video 1 and video 2, a Home PoC server can open a PoC session to transmit all of the initially proposed media types (i.e., audio 1, audio 2, video 1 and video 2) according to the aforementioned method, regardless of a media type adopted in an SIP response from a receiving-side network.

As described above, according to the present invention, when a PoC client providing a multimedia communication service supports a plurality of media types, and the media types supported by the PoC clients are not common, it is possible to selectively transmit media according to the types of media based on the PoC user' choice.

Also, according to the present invention, although a UE supporting all types of media supported by senders to transmit multimedia streams does not participate in a corresponding session, the corresponding session can be opened within a short time, and UEs participating in the corresponding session can receive an optimum media stream.

In addition, according to the present invention, a new media type can be added at the time of granting the next floor when the new media type is supported by a new participant during a session, so that it is possible to provide a substantial multimedia PoC service.

Furthermore, since the PoC user can select only a required type of media, the size of the media stream transmitted to the UE is reduced, thereby improving the efficiency of wireless transmission and reducing the cost to the PoC service user.

What is claimed is:

1. A method for supporting a plurality of multimedia types of a communication service in a server, the method comprising the steps of:
   receiving a session participation request message from a session open request Push-to-Talk (PTT) over Cellular (PoC) client, the session participation request message including at least one session open request message among a plurality of multimedia types;
   transmitting the session participation request message including the at least one session open request message to at least one session participation PoC client based on the session participation request message;
   receiving a first response message in response to the session participation request message from the at least one session participation PoC client, the first response message including media type information of the at least one session participation PoC client;
   storing the media type information of the at least one session participation PoC client in a memory; and
   transmitting, to the session open request PoC client, a second response message in response to the at least one session participation PoC client, independent of the media type information of the at least one session participation PoC client.

2. The method as claimed in claim 1, wherein the server supports a multimedia service through a Session Initiation Protocol (SIP).

3. The method as claimed in claim 1, wherein the server is a PoC server.

4. The method as claimed in claim 1, wherein the session open request PoC client is a terminal supporting the plurality of multimedia types of the communication service, the multimedia types including voice, instant message, and video.

5. The method as claimed in claim 1, wherein the session participation request message received from the session open request PoC client includes at least one of information of the at least one session participation PoC client and a required media parameter.

6. The method as claimed in claim 5, wherein the required media parameter includes at least one of rate, payload type, and an encoding method for audio and video of each of the plurality of multimedia types when a required session is related to the plurality of multimedia types.

7. The method as claimed in claim 1, wherein the session participation request message is received by using SIP/IP core network protocol.

8. The method as claimed in claim 1, wherein the first response message received from the at least one session participation PoC client includes at least one of the plurality of the multimedia types included the session participation request message.

9. The method as claimed in claim 1, wherein the step of transmitting the second response message comprises:
   selecting at least one multimedia type from the plurality of multimedia types requested by the session open request PoC client; and
   inserting information of the selected at least one multimedia type into a floor granted message, and transmitting the floor granted message to the session open request PoC client.

10. The method as claimed in claim 1, further comprising:
    receiving, by the server, multimedia data from the session open request PoC client;
    comparing, by the server, the received multimedia data with the stored media type information of the at least one session participation PoC client; and
    screening, by the server, only media type information capable of being received by the at least one session participation PoC client according to a result of the comparison, and transmitting the screened media type information to the at least one session participation PoC client.

11. The method as claimed in claim 1, wherein the step of the storing the media type information of the at least one session participation PoC client comprises:
    receiving and updating a media type change message from the at least one session participation PoC client when transmitting media or a continuing session.

12. The method as claimed in claim 1, further comprising:
    receiving a floor request from the at least one session participation PoC client participating in a session;
    transmitting a floor granted message to the at least one session participation PoC client according to the floor request; and
    transmitting a floor taken message to other session participation PoC clients not having a floor.

13. The method as claimed in claim 12, wherein the floor taken message includes at least one of information about a number of session participants, a number of supporting clients for each multimedia type, and addresses of session participants according to multimedia type.

14. The method as claimed in claim 12, wherein the floor taken message further includes media type information of the at least one session participation PoC client having the floor.

15. The method as claimed in claim 12, wherein the floor granted message has a message format of a Media Burst Control Protocol (MBCP).

16. The method as claimed in claim 1, further comprising:
    receiving, by the server, multimedia data from the session open request PoC client;

transmitting the received multimedia data to the at least one session participation PoC client, without comparing the received multimedia data with the stored media type information of the at least one session participation PoC client.

17. The method as claimed in claim 1, wherein the server generates a floor granted message when a plurality of session participation PoC clients exist, and transmits a message to provide or to end the generated floor granted message to one of the plurality of session participation PoC clients.

18. The method as claimed in claim 17, wherein the message to provide or to end the generated floor granted message is determined according to a predetermined time.

19. The method as claimed in claim 1, further comprising:
receiving, by the server, multimedia data from the session open request PoC client;
comparing, by the server, the received multimedia data with the stored media type information of the at least one session participation PoC client; and
when a media type of the received multimedia data is a media type incapable of being received by the at least one session participation PoC client according to a result of the comparison, the received multimedia data is not transmitted to the at least one session participation PoC client.

* * * * *